3,037,030
PHTHALOCYANINE DYESTUFFS
Julius Eisele, Ludwigshafen (Rhine), Wilhelm Federkiel, Frankenthal, Pfalz, Curt Schuster and Robert Gehm, Ludwigshafen (Rhine), Arnold Tartter, Lambsheim, Pfalz, and Fritz Graser, Werner Rohland, and Erich Stoeckl, Ludwigshafen (Rhine), Germany, assignors to Badische Anilin- & Soda-Fabrik Aktiengesellschaft, Ludwigshafen (Rhine), Rheinland-Pfalz, Germany
No Drawing. Original application Dec. 18, 1957, Ser. No. 703,485. Divided and this application May 22, 1959, Ser. No. 818,996
Claims priority, application Germany Dec. 19, 1956
3 Claims. (Cl. 260—314.5)

This invention relates to dyestuffs which contain at least once the grouping:

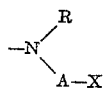

in which R represents a hydrogen atom, an alkyl, aralkyl, cycloalkyl, aryl, halogenalkyl, hydroxyalkyl or acyl group, A an alkylene radical with up to 4 carbon atoms in the chain, which may be branched and/or may contain hydroxyl groups, and X a chlorine or bromine atom, and to methods for the production of such dyestuffs.

The invention relates more specifically to dyestuffs which contain at least once the grouping

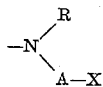

(R, A and X having the above significance) and which are capable of dyeing or printing structures of natural and/or regenerated cellulose.

We have found that new valuable dyestuffs of the tetrazaporphin series are obtained by acylating tetrazaporphin compounds containing amino groups with arylcarboxylic acid halide sulfonic acid halogen alkylamides.

Dyestuffs obtainable according to the invention are for example tetrazaporphin dyestuffs of the general formula

in which A represents a tetrazaporphin compound, D the group —E.NH.CO.Ar.SO$_2$.X, G a monovalent radical selected from the group consisting of a —SO$_3$H group, a

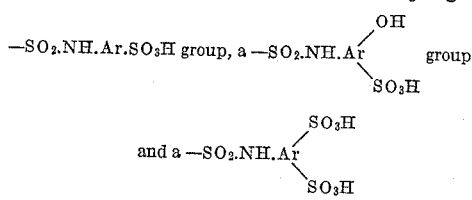

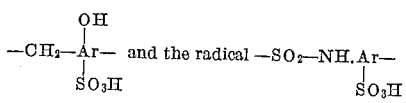

group, Y a whole number of from 1 to 4, Z a whole number of from 0 to 3 and (Y+Z) a whole number of from 1 to 4, and wherein E represents an atomic bridge selected from the group consisting of a direct linkage, the radical $$-CH_2-\underset{\underset{SO_3H}{|}}{Ar}- \text{ and the radical } -SO_2-\underset{\underset{SO_3H}{|}}{NH.Ar}-$$

Ar an aromatic radical which contains up to two benzene nuclei, and X the radical of a halogen alkylamine which contains up to four carbon atoms.

As tetrazaporphins containing amino groups there come into question above all derivatives of copper phthalocyanine containing amino groups, but also derivatives, containing amino groups, of nickel, cobalt, iron, molybdenum, aluminum and zinc phthalocyanines or of metal-free phthalocyanine. The derivatives containing amino groups may also be derived from substituted phthalocyanines, for example from di- or tetra-phenyl copper phthalocyanine, tetraphenylsulfone copper phthalocyanine or tetrachlor- or brom-copper phthalocyanine. Derivatives of azaphthalocyanines or naphthophthalocyanines containing amino groups can also be used. There are also suitable for the new process, derivatives, containing amino groups, of tetraza-mono-, -di- or -tribenzoporphins, for example of tetraza-tetramethyl or -tetraphenyl-dibenzo-copper or -nickel porphins, and also of tetrazaporphins, such as tetraza-tetramethyltetraphenyl nickel porphin or tetrazaoctaphenyl copper phthalocyanine.

The amino groups may be combined to the nucleus of the tetrazaporphin directly or by way of any group situated outside the tetrazaporphin nucleus proper, and may be present once or more than once in the same molecule. It is advantageous when the tetrazaporphin derivatives containing amino groups also contain watersolubilizing groups, such as sulfonic acid, sulfonic acid amide or carboxyl groups. Compounds of this kind are for example tetramino copper phthalocyanine, tetrasulfonic acid, diamino copper phthalocyanine dicarboxylic acid, or disulfonic acid, or disulfonic acid amide, bis- or tetrakis-(aminomethyl) copper phthalocyanine di- or tetrasulfonic acid, bis-(N-ethyl-N-(gamma-aminopropyl)-aminoethyl) copper or nickel phthalocyanine di-, tri- or tetrasulfonic acid and also reaction products of chloromethylated tetrazaporphins with aromatic compounds which contain for example up to two benzene rings, for example with aminophenols or aminophenol ethers or their sulfonic acid in a sulfuric acid liquid, such as benzyl- or -methylenenaphthyl tetrazaporphins having hydroxyl or alkoxyl, amino and sulfonic acid groups, which can be obtained for example by reaction of bis- tris- or tetrakis-(chloromethyl)-copper or nickelphthalocyanines with for example 1-hydroxy-3- or -4-aminobenzene, 1-methoxy- or -ethoxy-2- or -4-aminobenzene, hydroxyaminonaphthalenes or 1-hydroxy-2-aminobenzene-4-sulfonic acid. There may be mentioned especially products which have been obtained by complete or partial reaction of sulfochlorinated tetrazaporphins with aryl sulfonic acids which contain for example up to two benzene rings, and which contain at least two free amino groups, for example the reaction products of copper, nickel, cobalt, iron or aluminum phthalocyanine tri- or tetra-sulfonic acid chlorides with for example 1.3- or 1.4-diaminobenzene monosulfonic acid, 1.4-diaminobenzene disulfonic acid, 4.4'-diaminodiphenylamine-3-sulfonic acid, 4.4'-diaminodiphenyl sulfide disulfonic acid, 4.4'-diaminodiphenyl mono- or disulfonic acids, diaminostilbene disulfonic acids or 1.5-diaminonaphthalene-3.7-disulfonic acid. If the sulfonic acid chloride groups are only partially reacted, the remaining sulfonic acid chloride groups can for example be saponified or converted by treatment with monoamino-alkyl or -aryl sulfonic acids or monoaminohydroxyaryl-sulfonic acids into the corresponding sulfonic acid amide groups.

As aryl carboxylic acid halide sulfonic acid halogen alkylamides which contain for example up to two benzene nuclei, such as benzene or naphthalene carboxylic acid chloride or bromide sulfonic acid chlor- or brom-alkylamides, of which the aryl radicals may also bear substituents, for example alkyl, aralkyl, aryl, hydroxyl, alkoxyl, aroxyl, sulfonic acid, sulfonic acid halogen alkylamide or nitro groups and/or halogen atoms, such as chlorine atoms or bromine atoms, there are above all suitable compounds of which the sulfonic acid halogen alkylamide groups contain the halogen and the nitrogen combined with two adjacent carbon atoms, and contain in the alkyl radical up to four carbon atoms, such as arylcarboxylic acid halide sulfonic acid- beta-chlorethylamides, -beta-chlorpropylamides, -beta-chlorbutylamides or -beta-chlorisopropylamides. Such compounds may be obtained for example by reaction of suitable arylcarboxylic acid sulfonic acid chlorides with the corresponding chlor- or hydroxyalkylamines and subsequent treatment for example with thionyl chloride. As suitable arylcarboxylic acid sulfonic acid chlorides there may be mentioned for example 1-carboxybenzene-3- or -4-sulfonic acid chloride, 1-carboxy-4-chlor- or -brombenzene-3-sulfonic acid chloride, 1-carboxy-2-nitrobenzene-4-sulfonic acid chloride, 1-carboxy-3-nitrobenzene-5-sulfonic acid chloride, 1-carboxy-2- or 4-methoxybenzene-5-sulfonic acid chloride, 1-carboxy-2-hydroxybenzene-4-sulfonic acid chloride, carboxymethylbenzene sulfonic acid chlorides, 2-carboxynaphthalene-3-sulfonic acid chloride, 1-hydroxy-2-carboxynaphthalene-4-sulfonic acid chloride, 2-hydroxy-3-carboxynaphthalene-1-sulfonic acid chloride or 1-carboxy-2-hydroxynaphthalene-6-sulfonic acid chloride. The arylcarboxylic acid halide sulfonic acid halogen alkylamides may if desired also contain free sulfonic acid groups.

The new dyestuffs may be prepared for example in organic solvents, especially in solvents miscible with water, such as acetone, dioxane, glycol ethers, dimethyl or diethyl formamide or N-methylpyrrolidone. It is most economical, however, to work in aqueous liquid and only to use if necessary such an amount of an organic solvent, for example acetone, as is necessary for the dissolution of the arylcarboxylic acid halide sulfonic acid halogen alkylamides. The reaction can be carried out at room temperature or while cooling, preferably at temperatures between —5° and +10° C. in an acid or weak alkaline liquid. If necessary there may be slight heating towards the end of the reaction. To bind the hydrogen halide set free by the acylation, acid-binding agents are added, such as sodium or potassium carbonate, bicarbonate, acetate or dilute aqueous alkali hydroxide solutions. The dyestuff, separated if necessary by salting out and/or acidification, is filtered off by suction and preferably dried at moderately elevated temperature, advantageously under reduced pressure. The water adhering to the dyestuffs filtered by suction can also be removed by treatment with organic agents.

The dyestuffs obtainable according to the new process are in general very well soluble in water and can be used for dyeing and printing textile materials of all kinds. Dyeing or prints of very good general properties are obtained, especially on structures of natural and regenerated cellulose.

With the new deystuffs, dyeings and prints of very good fastness to moisture and rubbing can be produced on structures, such as fibres, flocks, threads, woven or knitted fabrics, of natural and/or regenerated cellulose by treating the cellulose with alkaline agents before or during or after the dyeing or printing and then if necessary by heating for a short time of about one to ten minutes to temperatures from 100° C. up to 200° C. There thereby probably takes place a linkage of the dyestuff residue by means of the group A to oxygen atoms of the cellulose, comparable with alkylation, whereby alkali halide is split off.

The dyestuffs which contain the grouping

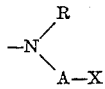

insofar as they are sufficiently soluble in water, can be used for dyeing from aqueous solution. Dyestuffs which are insoluble in water are used in finely dispersed form.

The process can be carried out by slop-padding the cellulose with a solution or dispersion of the dyestuff and leading it preferably after drying, through a bath which contains alkali, for example, sodium or potassium hydroxide or carbonate or bicarbonate, the dyestuff then being fixed on the fibre by steaming.

The alkali may, however, also be added to the dyebath and the dyestuff fixed by gradual increase in the bath temperature. Finally the cellulose may also be pretreated with a solution of alkali hydroxide at elevated temperature, dried, then dyed with a dyestuff of the kind according to this invention and aftertreated with hot air.

Since the reactivity of the halogen atom X is different in each case, the dyeing procedure, i.e., especially the nature and concentration of the alkali, the duration and temperature of the alkali treatment and the steaming or hot air treatment, must be adapted to the dyestuff concerned; the most favorable conditions can readily be determined by preliminary experiments.

The process may be used both with natural and with regenerated cellulose, and indeed both with fibres and with fabrics, flocks, threads and knitted goods.

The dyeing thus obtained have very good fastness to water, washing and rubbing.

In the case of printing, the dyestuff is brought onto the fibre together with a thickening agent, such as sodium alginate or tragacanth, and an alkaline agent, and then dried and steamed. The fabric may also be printed with the dyestuff together with a thickening agent and the usual printing auxiliaries, dried, led through a bath charged with an alkaline agent, dried and then steamed. The prints thus obtained have very good fastness to light, moisture and rubbing.

The following examples will further illustrate this invention but the invention is not restricted to these examples. The parts specified in the examples are parts by weight, and the percentages specified are percentages by weight.

*Example 1*

25 parts of copper phthalocyanine are heated in 200 parts of chlorsulfonic acid for 3 hours at 130° C. The sulphochlorination product which is separated by slowly allowing the acid solution to flow into ice-water and filtration is reacted with 25 parts of 1,4-diaminobenzene-2-sulfonic acid in the presence of dilute aqueous sodium carbonate solution and filtered off by suction after precipitation with dilute hydrochloric acid. The filtered material, a copper phthalocyanine containing sulfonic acid-(aminobenzenesulfonic acid)-amide groups, is dissolved in 700 parts of water with the addition of dilute aqueous sodium hydroxide solution to a pH value of about 8. During the course of 1 to 2 hours there is stirred into this solution in small portions a mixture, cooled to 0° C. of 40 parts of benzoyl chloride-metasulfonic acid-chlorethylamide, 200 parts of acetone and 100 parts of ice-water and at the same time about 10% aqueous sodium carbonate solution is introduced at such a rate that the pH value of the reaction mixture amounts to 6 to 7. After removing the cooling, it is stirred for another 2 hours at 10° to 20° C. and the reaction product is then separated by the addition of potassium chloride, filtered, washed with methanol and dried in the air.

100 parts of a dyestuff are obtained which readily dissolves in water with a blue color and which can be used for dyeing wool.

Quite similar dyestuffs are obtained by reacting copper phthalocyanine di-, tri- or tetra-sulfonic acid chlorides with 1.3-diaminobenzene-4-sulfonic acid, 1.4-diaminobenzenedisulfonic acid, 4.4'-diaminodiphenyl mono- or di-sulfonic acids, 1.5-diaminonaphthalene-3.7-disulfonic acid, diamino stilbene disulfonic acids, 4.4'-diaminodiphenylamine sulfonic acids or 4.4'-diaminodiphenylsulfide sulfonic acids.

Dyestuffs of a more greenish blue color are obtained in a corresponding way by using nickel, iron and aluminum phthalocyanine trisulfonic acid chlorides instead of sulfochlorinated copper phthalocyanine.

Example 2

The product obtained by reaction of 13 parts of a mixture of copper phthalocyanine di- and tri-sulfonic acid chlorides with 7 parts of 4.4'-diaminodiphenyl-3-sulfonic acid in the presence of excess aqueous sodium carbonate solution is dissolved in the form of moist filtered material in about 500 parts of water and cooled with ice-water. Into this solution there is introduced while stirring a solution of 10 parts of benzoyl chloride-meta-sulfonic acid-chlorisopropylamide in 100 parts of acetone slowly in small portions. At the same time a dilute aqueous sodium carbonate solution is allowed to flow in in such a way that the reaction of the reaction mixture remains neutral. After some hours of reaction time, dilute hydrochloric acid is added until the pH amounts to about 4. After salting out with sodium chloride, the reaction product is filtered off and dried at low temperature under reduced pressure. 55 parts of a blue dyestuff containing salt are obtained which is suitable for printing or dyeing textile materials of all kinds.

Similar dyestuffs are obtained from benzoyl chloride-meta-sulfonic acid chlorethylamide, 4-chlor- or 4-brom-benzoyl chloride-3-sulfonic acid-chlorisopropylamide or naphthalene-2-carboxylic acid chloride-3-sulfonic acid-chlorethylamide and copper phthalocyanine di-, tri- or tetra-sulfonic acid chlorides partially reacted with 4,4'-diaminodiphenyl disulfonic acid, 1.4-diamino-benzene mono- or di-sulfonic acids, 1.3-diaminobenzene sulfonic acid, 1.5-diaminonaphthalene-3.7-disulfonic acid, diaminostilbene sulfonic acids, 4.4'-diaminodiphenyl sulfide sulfonic acids or 4.4'-diaminodiphenylamine-3-sulfonic acid.

Example 3

Into a neutralized aqueous solution of 30 parts of a copper phthalocyanine containing one hydroxyaminobenzyl sulfonic acid group (which has been obtained by reaction of tetrakis-(chlormethyl)-copper phthalocyanine with 1-hydroxy-2-aminobenzene in sulfuric acid monohydrate and subsequent sulfonation in 10% oleum), there is introduced while cooling and stirring a solution of 25 parts of benzoyl chloride-para-sulfonic acid chlorethylamide in acetone and 50 parts of an about 10% aqueous sodium carbonate solution in such a way that the reaction mixture remains weakly acid. After stirring for several hours at room temperature, the reaction product is separated at a pH value of 6.5 by addition of potassium chloride and filtered off. The filtered material which has been washed with aqueous potassium chloride solution is then dried at low temperature. 65 parts of a green-blue dyestuff containing salt are obtained which dyes cotton green-blue shades with good wet fastness.

Instead of the above-mentioned copper phthalocyanine derivative there may also be used the products obtained by reaction of copper phthalocyanine derivatives having 2 to 8 chlormethyl groups with 1-methoxy-4-aminobenzene, 1-hydroxy-7-aminonaphthalene or 1-hydroxy-2-aminobenzene-4-sulfonic acid in sulfuric acid, and if desired subsequently sulfonated, and these may be acylated with benzoyl chloride-meta-sulfonic acid chlorethylamide, benzoyl chloride-para-sulfonic acid chlorisopropylamide, 2-nitrobenzoyl chloride-4-sulfonic acid chlorethylamide or 4-chlorbenzoyl chloride-3-sulfonic acid chlorethylamide.

Example 4

25 parts of bis-(aminomethyl)-copper phthalocyanine disulfonic acid are dissolved in water and neutralized by the addition of dilute aqueous sodium hydroxide solution. Then at 0° to +5° C. there are introduced 150 parts of an about 15% solution of benzoyl chloride-meta-sulfonic acid chlorethylamide in acetone and the reaction mixture, which has become acid, is neutralized by the addition of dilute aqueous sodium acetate solution. When the reaction is ended, the solution is acidified slightly and the product salted out. The dyestuff, after it has been filtered off by suction and dried by washing with acetone, dissolves in water with a blue color and dyes wool blue shades from an acetic acid bath.

A similar blue dyestuff is obtained by reaction of bis-(N-aminopropyl-N-methyl- or -ethylaminomethyl)-copper phthalocyanine disulfonic acid (obtained by treating the reaction product of bis-chlormethylcopper phthalocyanine with N.N-dimethyl- or diethylpropylene diamine in a boiling dilute alkali hydroxide solution and subsequent sulfonation in 23% oleum), while the corresponding reaction product of tetraminocopper phthalocyanine tetrasulfonic acid is more green in color.

Example 5

33 parts of a monochlorcopper phthalocyanine derivative of the four sulfonic acid chloride groups of which one has previously been reacted with 4.4'-diaminodiphenyl-2-sulfonic acid and three with 1-hydroxy-2-aminobenzene sulfonic acid, are stirred into 400 parts of water, neutralized with dilute aqueous sodium hydroxide solution and treated, as described in Example 47 or 48, with a solution of 15 parts of benzoyl chloride-meta-sulfonic acid chlorethylamide in 100 parts of acetone. Dilute hydrochloric acid is then introduced into the reaction mixture until a pH of 3 to 4 has been reached and the dyestuff then salted out with potassium chloride, filtered off by suction and dried by washing with methanol. It dyes cotton greenish blue shades.

In a similar way copper phthalocyanine derivatives, of the three or four sulfonic acid chloride groups of which one, two or three have previously been reacted with 1.3- or 1.4-diamino-benzene monosulfonic acid, 1.4-diaminobenzene disulfonic acid, 4.4'-diaminodiphenyl sulfide sulfonic acids, 4.4'-diaminodiphenylmono or di-sulfonic acids, diaminostilbene sulfonic acids, 4.4'-diaminodiphenylamine sulfonic acids or 1.5-diaminonaphthalene-3.7-disulfonic acid and the remaining sulfonic acid chloride groups with aminobenzene mono- or di-sulfonic acids or with hydroxyaminobenzene sulfonic acids, can be acylated with benzoyl chloride-meta-sulfonic acid chlorethylamide.

Example 6

29 parts of a copper phthalocyanine derivative of the three sulfonic acid chloride groups of which one has previously been reacted with 1.4-diaminobenzene-2-sulfonic acid or with 1.3-diaminobenzene-4-sulfonic acid and two with aminobenzene disulfonic acid, are dissolved in 400 parts of water, neutralized with dilute aqueous alkali hydroxide solution and, as described in Example 47 or 48, acylated with a solution of 12 parts of benzoyl chloride-para-sulfonic acid chlorethylamide in acetone. A blue dyestuff is obtained which dyes structures of natural and regenerated cellulose fast blue shades.

If the corresponding derivative of tetraphenylcopper phthalocyanine be acylated in a similar way, a dyestuff is obtained which dissolves in water with a green color, whereas with the diazacopper phthalocyanine derivative or the tetramethyldibenzonickel porphin derivative of which the sulfonic acid chloride groups have previously been reacted with 1.4-diaminobenzene disulfonic acid and 1-aminobenzene-3-sulfonic acid, dyestuffs are obtained which dissolve in water with a reddish blue color.

Example 7

A neutral aqueous solution of 40 parts of a product which is obtained by reaction of 1 mol of copper phthalocyanine trisulfonic acid chloride with 1.5 mols of 4.4'-diaminodiphenyl sulfide sulfonic acid in the presence of an excess of aqueous sodium carbonate solution and which consists of a mixture of a copper phthalocyanine disulfonic acid amide monosulfonic acid and a copper phthalocyanine monosulfonic acid amide disulfonic acid, is acylated in the manner previously described with 18 parts of benzoyl chloride-para-sulfonic acid chlorisopropylamide. A dyestuff soluble in water is obtained which dyes textile materials of cellulose fast greenish blue shades.

This is a divisional application of copending application Serial Number 703,485 filed on December 18, 1957, now abandoned, by Julius Eisele, Curt Schuster, Arnold Tartter, Werner Rohland, Wilhelm Federkiel, Robert Gehm, Fritz Graser and Erich Stoeckl.

What we claim is:

1. A compound of the formula

in which A is a member selected from the group consisting of metal-free phthalocyanine, copper phthalocyanine, nickel phthalocyanine, cobalt phthalocyanine, iron phthalocyanine, molybdenum phthalocyanine, aluminum phthalocyanine and zinc phthalocyanine, D is a member selected from the group consisting of

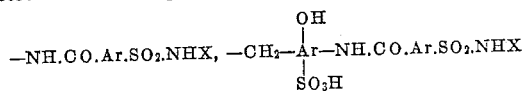

and

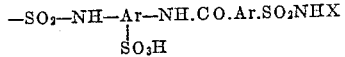

G is a monovalent radical selected from the group consisting of

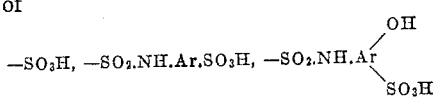

and

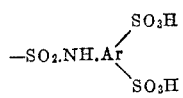

$Y$ is a whole number of from 1 to 4, $Z$ is a whole number of from 0 to 3 and $(Y+Z)$ is a whole number of from 1 to 4, Ar is a member selected from the group consisting of benzene and naphthalene, and X is selected from the group consisting of 2-chloralkyl having from 1 to 4 carbon atoms and 2-bromalkyl having from 1 to 4 carbon atoms.

2. The dyestuff of the formula

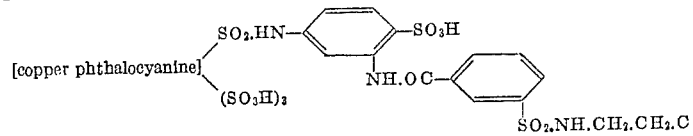

3. The dyestuff of the formula

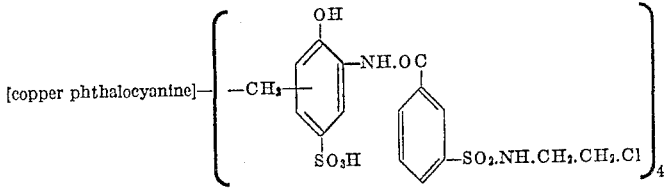

References Cited in the file of this patent

Lubs: Chemistry of Synthetic Dyes and Pigments, Reinhold, N.Y., N.Y. (1955), pages 594–6.

UNITED STATES PATENT OFFICE
CERTIFICATE OF CORRECTION

Patent No. 3,037,030             May 29, 1962

Julius Eisele et al.

It is hereby certified that error appears in the above numbered patent requiring correction and that the said Letters Patent should read as corrected below.

Column 8, the lower right-hand portion of the formula in claim 2, should appear as shown below instead of as in the patent:

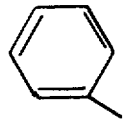

Signed and sealed this 11the day of September 1962.

(SEAL)
Attest:

ERNEST W. SWIDER
Attesting Officer

DAVID L. LADD
Commissioner of Patents